United States Patent
Ramani et al.

(10) Patent No.: US 9,946,331 B2
(45) Date of Patent: Apr. 17, 2018

(54) SYSTEM AND METHOD TO PROCESS SIGNALS HAVING A COMMON COMPONENT

(71) Applicant: Samsung Electronics Co., Ltd., Gyeonggi-do (KR)

(72) Inventors: Karthik Ramani, San Jose, CA (US); Kwontaek Kwon, Gyeonggi-do (KR); John W. Brothers, Calistoga, CA (US)

(73) Assignee: Samsung Electronics Co., Ltd. (KR)

( * ) Notice: Subject to any disclaimer, the term of this patent is extended or adjusted under 35 U.S.C. 154(b) by 192 days.

(21) Appl. No.: 14/712,675

(22) Filed: May 14, 2015

(65) Prior Publication Data

US 2015/0379673 A1 Dec. 31, 2015

Related U.S. Application Data

(60) Provisional application No. 62/018,157, filed on Jun. 27, 2014.

(51) Int. Cl.
*G06F 1/32* (2006.01)
*G06F 17/17* (2006.01)
*G06T 1/20* (2006.01)

(52) U.S. Cl.
CPC .......... *G06F 1/3293* (2013.01); *G06F 1/3237* (2013.01); *G06F 1/3243* (2013.01); *G06F 1/3287* (2013.01); *G06F 17/17* (2013.01); *G06T 1/20* (2013.01); *Y02B 60/1221* (2013.01);
(Continued)

(58) Field of Classification Search
CPC .... G06F 1/3293; G06F 1/3237; G06F 1/3243; G06F 1/3287; G06F 17/17; G06T 1/20; H03K 19/0016; G06K 9/6202; H04N 1/32224; H04N 19/80

USPC ................ 708/422; 382/356, 166, 232, 244, 382/218–222, 209, 300
See application file for complete search history.

(56) References Cited

U.S. PATENT DOCUMENTS

| 5,185,856 A | 2/1993 | Alcorn et al. |
| 5,892,516 A | 4/1999 | Alexander |
| 6,025,853 A | 2/2000 | Baldwin |

(Continued)

FOREIGN PATENT DOCUMENTS

| EP | 1383085 A2 | 1/2004 |
| WO | 2010048620 A1 | 4/2010 |

OTHER PUBLICATIONS

Pool, J., "Energy-Precision Tradeoffs in the Graphics Pipeline," [online] Doctoral Dissertation, 2012, University of North Carolina at Chapel Hill, retrieved from the Internet: <http://www.cs.unc.edu/~jpool/research/Dissertation/EnergyPrecisionTradeoffs.pdf>, 158 pg.

*Primary Examiner* — Chuong D Ngo
(74) *Attorney, Agent, or Firm* — Renaissance IP Law Group LLP (57) ABSTRACT

Signal processing may include determining a first component common to a first input signal and a second input signal and extracting the first component from at least one of the first input signal or the second input signal, a second component from the first input signal, and a second component from the second input signal. The second component of the first input signal may be different from the second component of the second input signal. An operation may be performed using the extracted, second components. The first component may be combined with a result of the operation.

14 Claims, 7 Drawing Sheets

(52) U.S. Cl.
CPC ....... *Y02B 60/1239* (2013.01); *Y02B 60/1282* (2013.01); *Y02B 60/32* (2013.01)

(56) References Cited

U.S. PATENT DOCUMENTS

| | | | |
|---|---|---|---|
| 6,356,276 B1 | 3/2002 | Acharya | |
| 6,542,963 B2 * | 4/2003 | Lee | G06F 7/57 708/605 |
| 6,882,364 B1 * | 4/2005 | Inuiya | H04N 9/045 348/237 |
| 7,130,467 B1 * | 10/2006 | Bronder | H04N 19/94 375/E7.209 |
| 7,466,867 B2 * | 12/2008 | Sung | H04N 19/61 341/67 |
| 7,646,817 B2 | 1/2010 | Shen et al. | |
| 7,685,408 B2 * | 3/2010 | Wolff | G06F 9/30018 712/224 |
| 7,983,500 B2 * | 7/2011 | Zeng | H04N 19/70 382/232 |
| 8,051,123 B1 | 11/2011 | Oberman et al. | |
| 8,098,257 B2 | 1/2012 | Donovan et al. | |
| 8,325,184 B2 | 12/2012 | Jiao et al. | |
| 8,441,497 B1 | 5/2013 | Hutchins et al. | |
| 8,644,643 B2 | 2/2014 | Jiao et al. | |
| 8,681,098 B2 | 3/2014 | Underkoffler et al. | |
| 8,711,144 B2 | 4/2014 | Johnson et al. | |
| 2004/0070582 A1 * | 4/2004 | Smith | A61B 8/4254 345/419 |
| 2012/0280973 A1 * | 11/2012 | Nagy | G06T 15/04 345/419 |
| 2015/0205589 A1 * | 7/2015 | Dally | G06F 8/4432 717/156 |

* cited by examiner

SYSTEM AND METHOD TO PROCESS SIGNALS HAVING A COMMON COMPONENT

CROSS-REFERENCE TO RELATED APPLICATIONS

This application claims the benefit of U.S. Provisional Patent Application No. 62/018,157 filed on Jun. 27, 2014, which is fully incorporated herein by reference.

TECHNICAL FIELD

This disclosure relates to integrated circuits and, more particularly, to reducing power consumption while performing signal processing operations on signals having a common component.

BACKGROUND

Processors, whether graphics processing units (GPUs), digital signal processors (DSPs), central processing units (CPUs), or the like, perform many different types of operations in a variety of different contexts. These operations often require a significant amount of power. Power consumption of a processor may be further exacerbated by the fact that the operations are performed repetitively over a period of time to complete a given signal processing task. For example, in the case of graphics processing, applying a texture filter to an image or a series of images when rendering video may be particularly power intensive.

SUMMARY

A method of signal processing includes determining a first component common to a first input signal and a second input signal. The method also includes extracting the first component from at least one of the first input signal or the second input signal, a second component from the first input signal, and a second component from the second input signal. The second component of the first input signal is different from the second component of the second input signal. The method further includes performing an operation using the extracted, second components and combining the first component with a result of the operation.

A system includes a correlation detection circuit configured to determine a first component common to a first input signal and a second input signal. The system also includes a component handling circuit configured to extract the first component from at least one of the first input signal or the second input signal, a second component from the first input signal, and a second component from the second input signal. The second component of the first input signal is different from the second component of the second input signal. The system further includes an operations circuit configured to perform an operation using the extracted, second components and an output selection circuit configured to combine the first component with a result of the operation.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits and, more particularly, to reducing power consumption while performing signal processing operations on signals having a common component. In accordance with the inventive arrangements described within this disclosure, a processor may include circuitry configured to identify a common component within received signals. The common component may be distinguished from uncommon components of the signals. A common component is a portion, e.g., one or more bits, of a multi-bit signal that is the same as, or matches, the corresponding portion, or bits, of one or more other multibit input signals. An uncommon component is a portion of a multibit signal that does not match, e.g., is not the same, as the same portion of one or more other multibit signals. The common component and the uncommon components may be extracted and processed.

In one aspect, the uncommon components may be provided to an operations circuit, while the common component is not operated upon by the operations circuit. For example, the common component may bypass the operations circuit. A result generated by the operations circuit may be combined with the common component. Power consumption may be reduced by effectively reducing the width of the input signals upon which the operations circuit operates. The width of the signals operated upon may be effectively reduced by the width of the common component.

In some cases, the operations circuit may operate only upon the uncommon components by operating upon a version of each input signal with the common component zeroed out in each respective signal. In other cases, circuit elements within the operations circuit that would otherwise operate upon bits of the common component may be disabled, while those circuit elements that operate upon bits of the uncommon components may be enabled or remain activated as the case may be. Thus, rather than operate on the entirety of the received signals, the operations circuit may operate only upon the uncommon components. The portion of the operations circuit that would otherwise operate upon the common component may be disabled.

The inventive arrangements described herein may be implemented as a method or process performed by a data processing system and/or an electronic circuit such as an integrated circuit (IC) within a data processing system. The IC, for example, may be a processor. In another aspect, the inventive arrangements may be implemented as a system, e.g., an apparatus, such as an electronic circuit. The electronic circuit may be implemented as an IC that may implement, or include, a processor. Examples of processors may include, but are not limited to, central processing units (CPUs), graphics processing units (GPUs), controllers, digital signal processors (DSPs), or the like. Further, the processor may be part of a larger system such as a programmable IC, a data processing system or other computing and/or communication device, an entertainment and/or gaming system or console, an automobile, etc.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
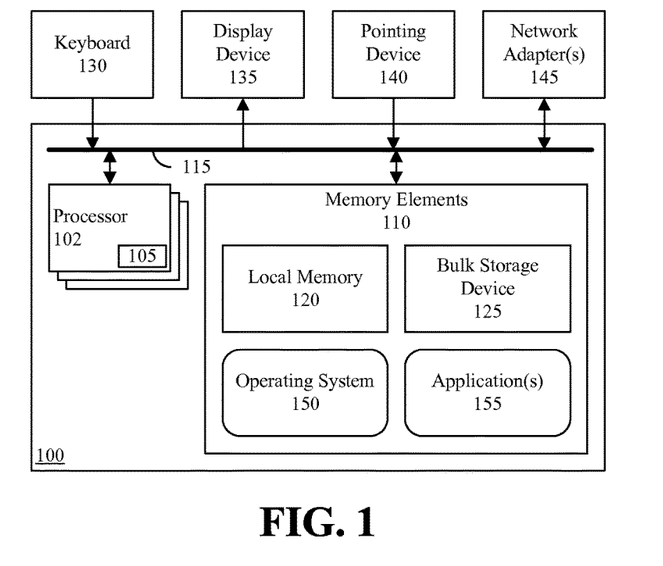
FIG. 1 is an exemplary architecture for a data processing system.

FIG. 1 is an exemplary architecture 100 for a data processing system. Architecture 100 may be used to implement any of a variety of different systems and/or devices that include a processor and memory capable of performing the operations described within this disclosure. In some cases, the particular system and/or device implemented using architecture 100 may include fewer components or more components than shown. Further, the particular operating system and/or application(s) included may vary. Exemplary systems that may use architecture 100 may include, but are not limited to, embedded systems, mobile phones, personal computing devices such as desktop, laptop, and/or tablet computing devices, servers, gaming consoles, entertainment systems, display devices, and the like.

As pictured, architecture 100 includes at least one processor 102. Examples of processor 102 may include, but are not limited to, a CPU, a DSP, a GPU, a controller, a field programmable gate array or other programmable integrated circuit, or the like. Processor 102 includes a system 105 implemented as circuitry and configured to perform signal processing. In one aspect, system 105 may be configured to operate upon signals with a common component. In another aspect, system 105 may be configured to operate upon signals and apply different processing techniques according to whether the signals are determined to include a common component. While operating upon signals that include a common component, system 105 may perform operations using less power than other conventional processors and/or processing techniques. In consequence, processor 102 may utilize less power, as will architecture 100 and/or any system utilizing and/or incorporating system 105 therein.

Processor 102 may be coupled to memory elements 110 through a system bus 115 or other suitable circuitry. Architecture 100 may store program code within memory elements 110. Processor 102 executes the program code accessed from memory elements 110 via system bus 115. Memory elements 110 include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), a solid state drive (SSD), or another persistent data storage device. Architecture 100 may also include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 may optionally be coupled to architecture 100. In some cases, one or more of the I/O devices may be combined as in the case where a touchscreen is used as display device 135. In that case, display device 135 may also implement keyboard 130 and pointing device 140.

The I/O devices may be coupled to architecture 100 either directly or through intervening I/O controllers. One or more network adapters 145 may also be coupled to architecture 100 to enable architecture 100 to become coupled to other systems, computer systems, remote printers, and/or remote storage devices through intervening private or public networks. Modems, cable modems, Ethernet cards, wireless transceivers, and/or wireless radios are examples of different types of network adapter 145 that may be used with architecture 100. Depending upon the particular device implemented using architecture 100, the specific type of network adapter 145, or network adapters as the case may be, will vary.

As pictured in FIG. 1, memory elements 110 may store an operating system 150 and optionally one or more applications 155. In one aspect, operating system 150 and application(s) 155, being implemented in the form of executable program code, are executed by architecture 100. As such, operating system 150 and application(s) 155 may be considered an integrated part of architecture 100. Operating system 150, application(s) 155, and any data items used, generated, and/or operated upon by architecture 100 are functional data structures that impart functionality when employed as part of a system implemented using architecture 100.

In some cases, architecture 100 may include operational software where operating system 150 and applications 155 are implemented as a single, larger program. For example, in the case where architecture 100 is used to implement an embedded system, the functions performed by operating system 150 and application(s) 155 may be combined and implemented as an integrated program.

Architecture 100 is presented for purposes of illustration only. In other examples, architecture 100 may include a processor 102 such as a CPU and a separate GPU. In general, a GPU is optimized for manipulating computer graphics, performing image processing, and the like. In some cases, the processor, e.g., the CPU, may offload particular tasks ordinarily performed by the CPU to the GPU for processing. In still other examples, the GPU may be implemented on a separate circuit board than processor 102. Further, the GPU may have separate memory elements, e.g., separate local memory, than processor 102. The GPU may include system 105 instead of processor 102. In another example, both processor 102 and the GPU may include system 105.

In one aspect, system 105 may be optimized for performing various arithmetic operations. In illustration, system 105 may be optimized for performing interpolation which may be applied in any of a variety of applications. In one exemplary application, system 105 may be used to perform interpolation in the context of filtering color values for image processing. For example, system 105 may be optimized for performing linear interpolation. System 105 may be configured to exploit coherence in received input signals. In the case of image processing, for example, system 105 may be optimized to exploit frequency invariance, i.e., frequency coherence and spatial locality, in the received input signals. An example of spatial locality is where a first input signal specifies a first texel, while a second input signal specifies a second and different texel that is within a predetermined distance of the first texel in an image. The first and second texels may be adjacent in the image. The existence of a common component between two signals, as described herein, indicates a frequency coherence that may be exploited for operations that occur on the two inputs.

Figure 2:
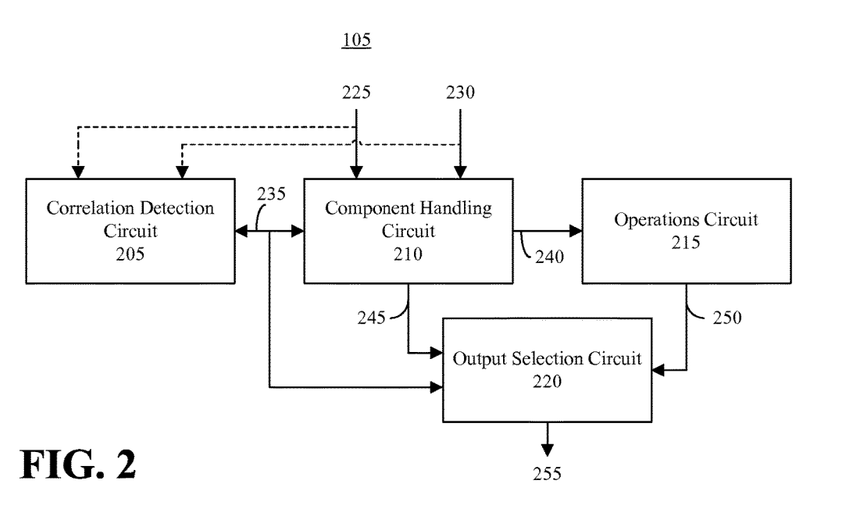
FIG. 2 is a block diagram illustrating an exemplary system for signal processing.

FIG. 2 is a block diagram illustrating an exemplary implementation of system 105 of FIG. 1. As discussed, in one embodiment, system 105 may be implemented using circuitry within a processor. Accordingly, the various blocks shown in FIG. 2 may represent circuits or circuitry within a processor. In the example of FIG. 2, system 105 includes a correlation detection circuit 205, a component handling circuit 210, an operations circuit 215, and an output selection circuit 220.

Correlation detection circuit 205 may receive all or a portion of a first input signal 225 and all or portion of a second input signal 230. In one aspect, correlation detection circuit 205 may receive signal 225 and/or signal 230 directly as illustrated using dashed lines in FIG. 2. In another aspect, correlation detection circuit 205 may receive all or a portion of each of signal 225 and/or signal 230 from component handling circuit 210 via signal 235.

Correlation detection circuit 205 is configured to determine whether signal 225 and signal 230 include one or more components common to both of signals 225 and 230, i.e., a common component. In one aspect, the common component may be the "x" most significant bits (MSBs) of signals 225 and 230, where "x" is an integer value greater than 0. The value of x may be less than or equal to the number of bits "n" of signals 225 and 230. In another aspect, the common component may be the "x" least significant bits (LSBs) of signals 225 and 230. The value of x may be less than or equal to the number of bits n of signals 225 and 230. Further, it should be appreciated that the number of bits evaluated for the MSBs need not be equal to the number of bits evaluated for the LSBs.

As used herein, the term "first component" means a number of the bits, whether LSBs or MSBs, of an input signal. The first component may be a number of bits that is less than or equal to the number of bits n of the input signals. The first component may or may not be common to signals 225 and 230. In the example of FIG. 2, the common component may be limited to a fixed size since correlation detection circuit 205 may be configured to compare only particular portions, e.g., a particular number of the MSBs and/or a particular number of the LSBs of signals 225 and 230.

Correlation detection circuit 205 compares signals 225 and 230 to determine whether some portion or all of signals 225 and 230 match, thereby indicating that signals 225 and 230 are coherent or are correlated. As pictured, correlation detection circuit 205 may indicate whether a match exists via signal 235. Signal 235 may be coupled to output selection circuit 220 and to component handling circuit 210. Signal 235 may indicate whether signals 225 and 230 share a common component, e.g., have at least some portion that matches.

Correlation detection circuit 205 may be implemented using any of a variety of known circuits. In one aspect, for example, correlation detection circuit 205 may be implemented as a frequency analysis circuit that identifies common lower frequency components and different higher frequency components of signals 225 and 230. In another aspect, correlation detection circuit 205 may be implemented using Boolean logic gates such as exclusive OR circuitry and OR circuitry or a leading 1 detector circuit.

Signals 225 and 230 are provided to component handling circuit 210. In general, component handling circuit 210 may be configured to extract, or separate, the first component from a second component in each of signals 225 and 230. The second component in each of signals 225 and 230 may be the remainder of each respective signal, e.g., the portion of each signal not included in the first component. In one aspect, component handling circuit 210 processes the first component and the second component of each of signals 225 and 230 within separate channels.

Component handling circuit 210 may generate output signals 240 and 245. In one aspect, signal 240 may specify the first component and the second component of each of signals 225 and 230. In one aspect, signal 245 may specify only the common component(s) of either signal 225 or signal 230 in the case where signals 225 and 230 are found to be coherent. As illustrated, signal 245 may bypass operations circuit 215.

Operations circuit 215 may be configured to perform any of a variety of different operations. For example, operations circuit 215 may be configured to perform arithmetic operations using signals 225 and 230, or portions thereof. In one particular example, operations circuit 215 may be configured to perform interpolation of signals 225 and 230. In another example, operations circuit 215 may be configured to perform linear interpolation. It should be appreciated, however, that other operations such as addition, multiplication, and the like also may be performed.

In one exemplary use case, operations circuit 215 may be configured to perform texture filtering as may be implemented within a GPU. In that case, operations circuit 215 may be configured to perform linear interpolation between signal 225 and signal 230. Signal 225 may specify a first texel while signal 230 specifies a second texel local to the first texel. For example, the first and second texels may be adjacent to one another or at least within a predetermined distance as measured within an image. In general, with regard to texture filtering, approximately 40 percent of the time signals 225 and 230 are the same. Approximately 70 percent of the time at least the four MSBs of signals 225 and 230 match. As such, power consumption may be reduced by limiting operations circuit 215 to operating only upon the portions of signals 225 and 230 that differ, e.g., the uncommon components.

In another example, operations circuit 215 may be configured to linearly combine two or more color values using weights to produce an output value. The output value may be a color value that lies between the two input values. For two input values I1 and I2 specified by signals 225 and 230, given linear weight values a1 and a2, where $a1+a2=1$, the resulting output value 0, e.g., the filtered value, may be expressed as O=a1*I1+a2*I2, where, I1<=O<=I2 and 0<=a1, a2<=1.0. Color values are typically in the range 0 to 255 and require at least eight bits of input precision in the filtering unit. If the weights require a precision of eight bits, 8×8 multipliers may be used.

In one aspect, operations circuit 215 may include two different channels. A first channel may operate upon the x MSBs of signals 225 and 230, e.g., the first components of signals 225 and 230. A second channel may operate upon the remainder of signals 225 and 230, e.g., the second components. Operations circuit 215 generates output signal 250. In one aspect, where signals 225 and 230 are coherent, signal 250 may specify a result of the operations performed by operations circuit 215 generated using only the uncommon components of signals 225 and 230. The common component(s) may not be utilized by operations circuit 215. In the case where signals 225 and 230 are not coherent, signal 250 may specify a result of operating upon signals 225 and 230 in their entirety, e.g., processing the first and second components of each of signals 225 and 230.

It should be appreciated that signal 250 may be coordinated, or synchronized with signals 235 and 245. Output selection circuit 220 may be configured to output signal 250 in its entirety as signal 255 in the case where signals 225 and 230 do not share a common component or are not coherent. In another aspect, output selection circuit 220 may output signal 255 in its entirety in the case where the first and second components of signals 225 and 230 both match. In another aspect, output selection circuit 220 may output signal 255 combined with at least a portion of signal 250 as signal 255 in the case where signals 225 and 230 do share a common component, but do not completely match. Combining signal 245 with a portion of signal 250 may mean concatenating the common component specified by signal 245 with at least a portion of the result of operating upon only the uncommon components of signals 225 and 230 specified by signal 250.

It should be appreciated that FIG. 2 illustrates an exemplary implementation of system 105 where the delineation, or boundary, between the first component and the second component of signals 225 and 230 is fixed. In other cases, the boundary between the first component and the second component may not be fixed as will be described herein in greater detail.

Figure 3:
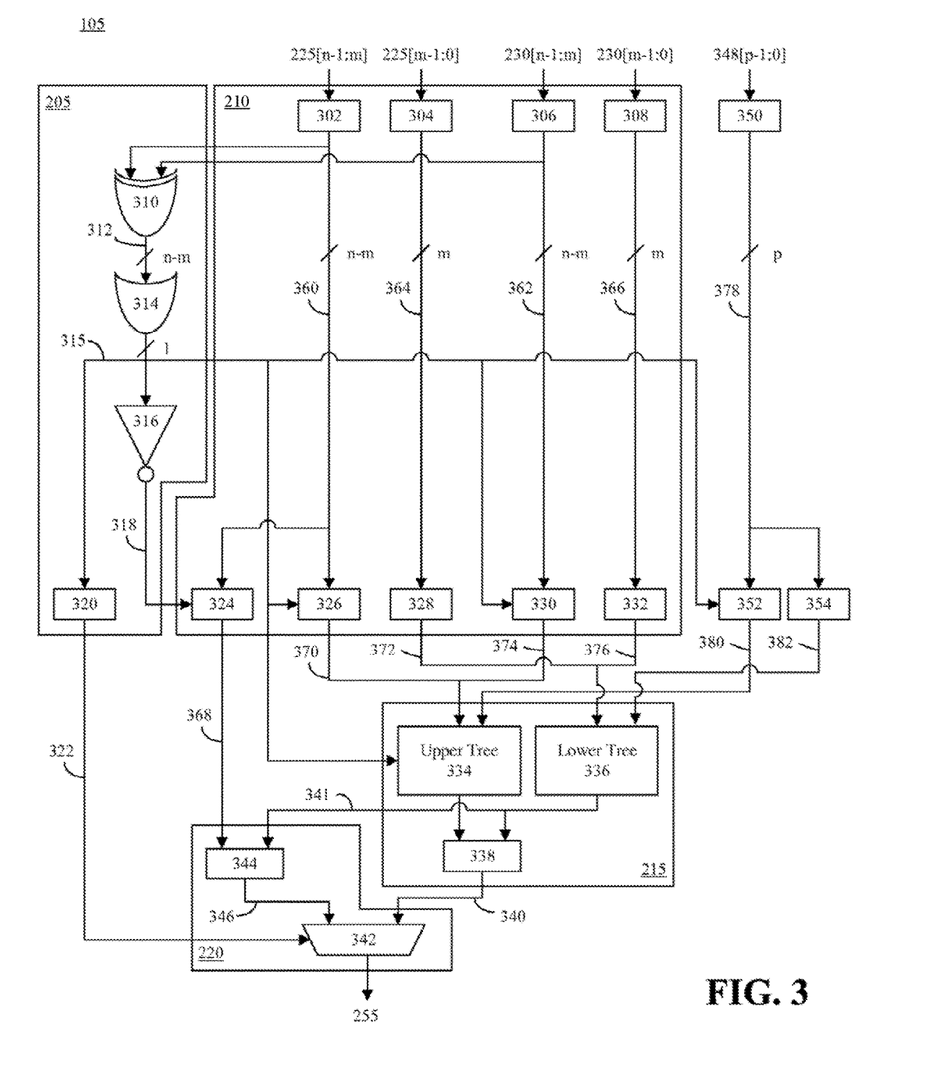
FIG. 3 is a block diagram illustrating an exemplary implementation of the system of FIG. 2.

FIG. 3 is a block diagram illustrating an exemplary implementation of system 105 of FIG. 2. FIG. 3 illustrates an example where the system evaluates only the x MSBs of signals 225 and 230 to determine whether the signals are coherent. As pictured, system 105 includes correlation detection circuit 205, component handling circuit 210, operations circuit 215, and output selection circuit 220. For purposes of clarity and ease of illustration, clock signals for the various circuit elements of FIG. 3 are not illustrated. For purposes of illustration, the bit width of signals 225 and 230 is n, n and m are integers greater than 0, and n>m.

Component handling circuit 210 includes registers 302, 304, 306, and 308. Register 302 receives the first component, or x MSBs, of signal 225. In the example of FIG. 3, the first component of signal 225 is also represented as 225[n−1:m]. In one particular example, n may be equal to eight, with m being equal to four. It should be appreciated, however, that the examples provided herein are for purposes of illustration and not limitation. Register 304 receives the second component, or remainder, of signal 225 also represented as 225[m−1:0]. Register 306 receives the first component of signal 230 also represented as 230[n−1:m]. Register 308 receives the second component of signal 230 also represented as 230[m−1:0]. Registers 302, 304, 306, and 308 effectively output a clocked, or delayed version, of the signal received by each respective register.

Signals 360 and 362 from registers 302 and 306, respectively, are provided to inputs of an exclusive OR circuit 310. As pictured, each of signals 360 and 362 is "n-m" bits in width. Exclusive OR circuit 310 generates an output signal 312 that is provided to an input of OR circuit 314. Each bit of signal 312 will be zero when signal 360 matches signal 362. When signal 360 does not match signal 362, at least one bit of signal 312 is non-zero. OR circuit 314 generates a one bit output signal 315. Signal 315 takes on a one value responsive to exclusive OR circuit 310 determining that signal 360 does not match signal 362. When signal 315 takes on a one value, signals 225 and 230 are not coherent. Signal 315 takes on a zero value responsive to exclusive OR circuit 310 determining that signal 360 does match signal 362. When signal 315 takes on a zero value, signals 225 and 230 are considered have a common component.

Inverter 316 receives signal 315 and generates signal 318. Signal 318 is an inverted version of signal 315. Signal 315 may be provided to register 320. Register 320 outputs signal 322, which may be provided as a select signal to multiplexer 342. Signals 315 and 318 further may be used as clock enable signals for one or more circuit blocks illustrated in FIG. 3. As pictured, for example, signals 315 and 318 are provided to component handling circuit 210 as clock enable signals.

Component handling circuit 210 may also include a plurality of registers 324, 326, 328, 330, and 332. Registers 324 and 326 each receive signal 360 as input signals. Register 324 further receives signal 318 as a clock enable signal. Register 326 receives signal 315 as a clock enable signal. Register 328 receives signal 364 as an input from register 304. Register 330 receives signal 362 as an input and receives signal 315 as a clock enable signal. Register 332 receives signal 366 as an input from register 308. Registers 324, 326, 328, 330, and 332 effectively output a clocked, or delayed version, of the signal received by each respective register. Upper tree 334 within operations circuit 215 also receives signal 315 as a clock enable signal.

Registers 324 and 326 output signals 368 and 370, respectively. Both signals 368 and 370 specify a delayed version of 225[n−1:m], but are output under different circumstances. Since signal 318 is an inverted version of signal 315, when register 324 is enabled and outputs signal 368, register 326 is disabled. When disabled, or deactivated, register 326 does not output signal 370, e.g., does not transition. Similarly, when register 326 is enabled and outputs signal 370, register 324 is disabled. While disabled, register 324 does not output signal 368, e.g., does not transition. Register 328 outputs signal 372, i.e., a delayed version of 225[m−1:0]. Register 330 outputs signal 374, i.e., a delayed version of 230[n−1:m]. As shown, register 330 is enabled and outputs signal 374 responsive to signal 315 taking on a 1 value, which coincides with enablement of register 326. Register 332 outputs signal 376, i.e., a delayed version of 225[m−1:0].

Operations circuit 215 receives signals 370, 372, 374, and 376 from registers 326, 328, 330, and 332, respectively. In the example of FIG. 3, operations circuit 215 may be implemented as an interpolator. As pictured, operations circuit 215 includes an upper tree 334, a lower tree 336, and a carry select adder circuit 338. In one aspect, upper tree 334 and lower tree 336 may be implemented as multiplier circuits. Upper tree 334 receives signals 370 and 374. Each of signals 370 and 374 specify first components. Lower tree 336 receives signals 372 and 376. Signals 372 and 376 specify second components.

A weight signal 348 specifying bits [p−1:0] is provided to register 350. P may be an integer value. The width of signal 380 and 382, e.g., p, may be equal to n. Register 350 outputs signal 378 to each of registers 352 and 354. Register 352 outputs signal 380, and register 354 outputs signal 382. Signals 380 and 382 may be delayed versions of signal 348. Upper tree 334 receives signal 380 from register 352. Lower tree 336 receives signal 382 from register 354. As pictured, register 352 also receives signal 315 as a clock enable signal. Accordingly, register 352 may output signal 380 under the same conditions as registers 324 and 330. In one aspect, one of upper tree circuit 334 or lower tree circuit 336 may receive a factor value specified by signal 380 or signal 382, while the other may calculate a factor value of 1−(the value of signal 380) or 1−(value of signal 382) as the case may be.

In one aspect, where signals 225 and 230 are n bits with n=8 and m=4, upper tree 334 and lower tree 336 each may be configured as 4×8 tree structures. Continuing with the example, carry select adder circuit 338 may be implemented as a 16 bit carry select adder circuit. When each of upper tree 334 and lower tree 336 is active, upper tree 334 and lower tree 336 each may output a 12 bit signal that is provided to carry select adder circuit 338. Carry select adder circuit 338, for example, may add the received signals and output a 16 bit signal, e.g., signal 340, to output selection circuit 220. More particularly, in the example of FIG. 3, signal 340 is provided to an input of multiplexer 342. As pictured lower tree 336 may output signal 341 to output selection circuit 220.

Output selection circuit 220 includes a register 344 and multiplexer 342. Register 344 combines, or concatenates, the output from lower tree 336 and signal 368 specifying 225[n−1:m] from register 324. Signal 346, which is a concatenation of the output from lower tree 336 and signal 368, is output from register 344 and provided to another input of multiplexer 342. Multiplexer 342 passes signal 346 or signal 340 as signal 255 responsive to signal 322, which serves as a control or select signal for multiplexer 342.

In a first operating state, signals 225 and 230 are not coherent. The first components of signals 225 and 230 do not match. Accordingly, registers 326 and 330 are enabled by signal 315 while register 324 is disabled by signal 318. As noted, signals 315 and 318 may be used as clock enable signals. Register 324 does not transition and does not pass signal 360. Registers 326 and 330 pass signals 370 and 374, respectively. Register 352 passes signal 380. Upper tree 334 is operable, e.g., enabled by signal 315, to process first components specified by signals 370 and 374 using the weight specified by signal 380. Lower tree 336 is operable to process second components specified by signals 372 and 376. Carry select adder circuit 338 outputs signal 340. Multiplexer 342 passes signal 340 as signal 255 responsive to signal 322.

In a second, different operating state, signals 225 and 230 are coherent. The first components of signals 225 and 230 match. Accordingly, registers 326, 330, and 352 are disabled by signal 315, while register 324 is enabled by signal 318. Registers 326 and 330 do not transition and, as such, do not output signals 370 and 374, respectively. Register 342 does not transition. Register 324, being enabled, outputs signal 368. Upper tree 334 is deactivated by signal 315, thereby conserving power. Only lower tree 336 is active to process uncommon components with the result being concatenated with signal 368, e.g., the common component. Multiplexer 342 passes signal 346 as signal 255 responsive to signal 322.

In the example of FIG. 3, the common component is extracted from signal 225. It should be appreciated, however, that the common component provided to register 344 may be extracted from signal 230. The common component may be extracted from either signal 225 or from signal 230.

Figure 4:
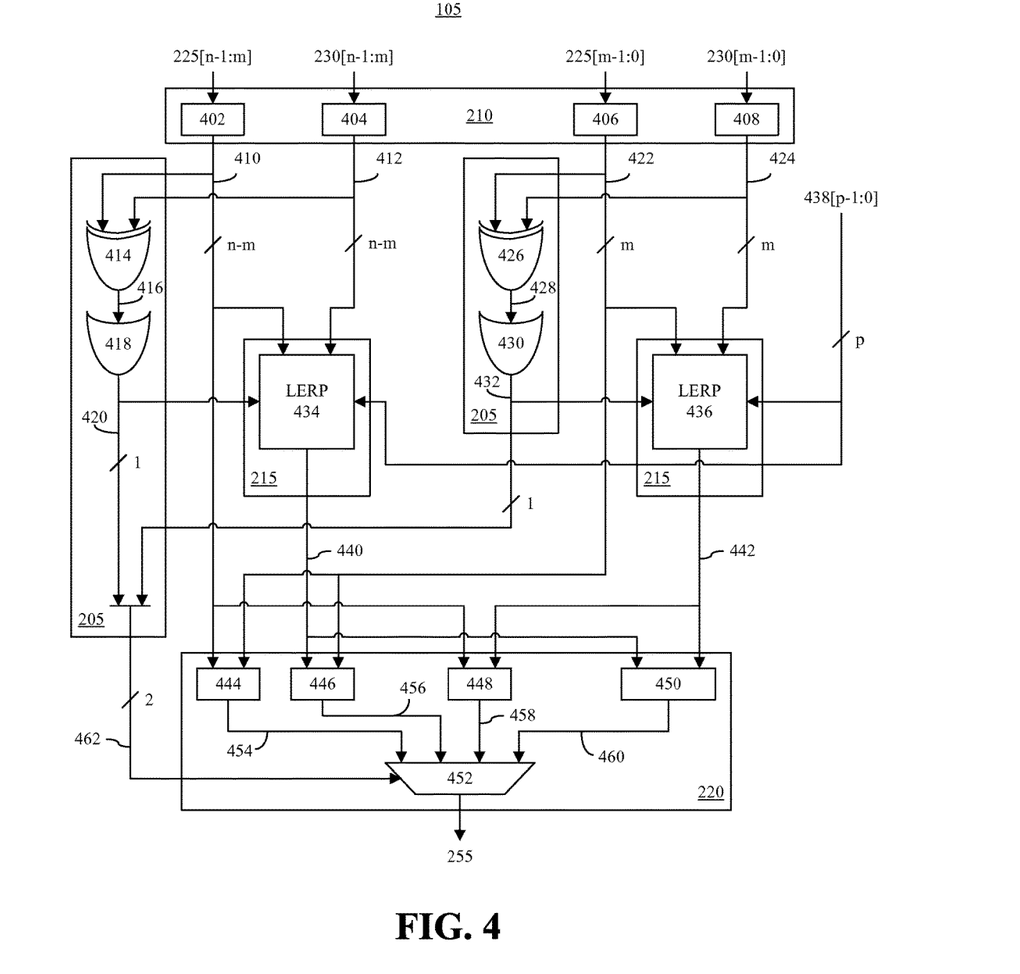
FIG. 4 is a block diagram illustrating another exemplary implementation of the system of FIG. 2.

FIG. 4 is a block diagram illustrating another exemplary implementation of system 105 of FIG. 2. FIG. 4 illustrates an example where the system evaluates both the first components and the second components of signals 225 and 230 to determine whether the signals are coherent. The boundary between the first and second components, like in FIG. 3, is fixed. As pictured, system 105 includes correlation detection circuit 205, component handling circuit 210, operations circuit 215, and output selection circuit 220. For clarity and ease of illustration, clock signals for the various circuit elements of FIG. 4 are not illustrated.

Component handling circuit 210 includes registers 402, 404, 406, and 408. Register 402 receives the first component of signal 225 represented as 225[n−1:m]. The bit width of signals 225 and 230 is n, n and m are integers greater than 0, and n>m. The bit width of the first component is n-m, as pictured. In one particular example, n may be equal to eight, with m being equal to four. It should be appreciated, however, that the examples provided herein are for purposes of illustration and not limitation. Further, the width of the first component need not be equal to the width of the second component whether referring to FIG. 3 and/or to FIG. 4. Register 404 receives the first component of signal 230 represented as 230[n−1:m]. Register 406 receives the second component, or remainder, of signal 225 represented as 225[m−1:0]. Register 408 receives the second component of signal 230 represented as 230[m−1:0]. Registers 402, 404, 406, and 408 effectively output a clocked, or delayed version, of the signal received by each respective register.

Signals 410 and 412 from registers 402 and 404, respectively, may be provided to inputs of correlation detection circuit 205. Correlation detection circuit 205 may include exclusive OR circuit 414 and OR circuit 418. For example, signals 410 and 412 may be provided to inputs of exclusive OR circuit 414. As pictured, each of signals 410 and 412 is "n-m" bits in width. Exclusive OR circuit 414 generates an output signal 416 that is provided to an input of OR circuit 418. Each bit of signal 416 will be zero when signal 410 matches signal 412. When signal 410 does not match signal 412, at least one bit of signal 416 is non-zero. OR circuit 418 generates a 1 bit output signal 420. Signal 420 takes on a 1 value responsive to exclusive OR circuit 414 determining that signal 410 does not match signal 412. When signal 420 takes on a 1 value, signals 410 and 412 do not match. Signal 420 takes on a zero value responsive to exclusive OR circuit 414 determining that signal 410 does match signal 412. When signal 420 takes on a zero value, signals 410 and 412 are considered at least partially coherent in that the first components match.

Signals 422 and 424 from registers 406 and 408, respectively, may also be provided to inputs of correlation detection circuit 205. Correlation detection circuit 205 further may include exclusive OR circuit 426 and OR circuit 430. For example, signals 422 and 424 may be provided to inputs of exclusive OR circuit 426. As pictured, each of signals 422 and 424 is "m" bits in width. Exclusive OR circuit 426 generates an output signal 428 that is provided to an input of OR circuit 430. Each bit of signal 428 will be zero when signal 422 matches signal 424. When signal 422 does not match signal 424, at least one bit of signal 428 is non-zero. OR circuit 430 generates a 1 bit output signal 432. Signal 432 takes on a 1 value responsive to exclusive OR circuit 426 determining that signal 422 does not match signal 424. When signal 430 takes on a 1 value, signals 422 and 424 do not match. Signal 432 takes on a zero value responsive to exclusive OR circuit 426 determining that signal 422 does match signal 424. When signal 432 takes on a zero value, signals 422 and 424 are considered at least partially coherent in that the second components match.

In one embodiment, the various wires used to route signals, e.g., signals 410, 412, 422, and/or 424, among the other circuits, including output selection circuit 220, may be considered part of component handling circuit 210.

In one aspect, signal 420 and signal 432 may be used as clock enable signals. As pictured, signal 420 and signal 432 may be provided to operations circuit 215. More particularly, signal 420 may be provided as a clock enable signal to a linear interpolation (LERP) circuit 434. Signal 432 may be provided as a clock enable signal to a LERP circuit 436.

LERP circuit 434 receives signals 410 and 412 as input signals. LERP circuit 434 further receives signal 438, which may be a multibit signal of "p" bits, where p is an integer value. The value of p may be non-zero. In one aspect, the value of signal 438 may be a weighting factor provided to each of LERP circuits 434 and 436 as shown. For example, one LERP circuit may use the value of signal 438 while the other LERP circuit uses the value of 1−(the value of signal 438). LERP circuit 434 generates an output signal 440. LERP circuit 436 generates an output signal 442.

Output selection circuit 220 may include registers 444, 446, 448, carry select adder circuit 450, and multiplexer 452. Output selection circuit 220 is configured to combine various signals as described herein. For example, register 444 may be configured to concatenate signals 410 and 422 into signal 454. Register 446 may be configured to concatenate signals 440 and 422 into signal 456. Register 448 may be configured to concatenate signals 410 and 442 into signal 458. Carry select adder circuit 450 may be configured to add and/or combine signals 440 and 442 into signal 460.

Signals 420 and 432, when considered collectively, may be referred to as signal 462. Signal 462, e.g., a two bit signal, may be provided to multiplexer 452 as a select signal. Multiplexer 452 passes signal 454, 456, 458, or 460 as signal 255 according to control signal 462.

Table 1 below illustrates the operation of the exemplary implementation of system 105 pictured in FIG. 4. As shown, LERP circuits 434 and 436 both need only be enabled in case 4. In cases 1-3, at least one of LERP circuits 434 or 436 is disabled, thereby reducing power consumed by the system. In case 3, both LERP circuits 434 and 436 may be disabled. In general, by evaluating both the first and the second components of signals 225 and 230, additional power savings may be achieved over the example of FIG. 3 in that both channels of operations circuit 215 may be disabled in some circumstances. Further, the number of cases where at least one channel of operations circuit 215 may be disabled is increased in comparison to the example of FIG. 3.

TABLE 1

| Case | Matching Components | Signal Passed as Signal 255 | State of LERP 434 | State of LERP 436 |
|---|---|---|---|---|
| 1 | 410 matches 412 only | 458 | Disabled | Enabled |
| 2 | 422 matches 424 only | 456 | Enabled | Disabled |
| 3 | 410 matches 412; and 422 matches 424 | 454 | Disabled | Disabled |
| 4 | No matching components | 460 | Enabled | Enabled |

Figure 5:
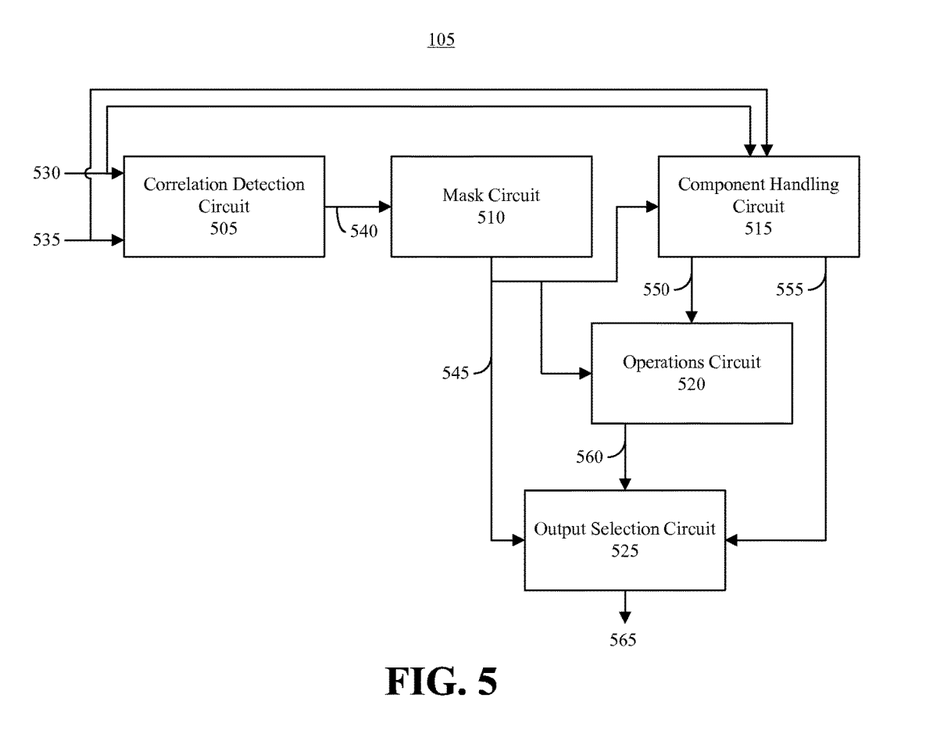
FIG. 5 is a block diagram illustrating another exemplary system for signal processing.

FIG. 5 is a block diagram illustrating another exemplary implementation of system 105 of FIG. 1. As discussed, system 105 may be implemented using circuitry within a processor. Accordingly, the various blocks shown in FIG. 5 may represent circuits or circuitry within a processor. In the example pictured in FIG. 5, system 105 includes a correlation detection circuit 505, a mask circuit 510, a component handling circuit 515, an operations circuit 520, and an output selection circuit 525.

Correlation detection circuit 505 receives a first input signal 530 and a second input signal 535. Correlation detection circuit 505 is configured to determine whether signal 530 and signal 535 include a first component that is common to both signals 530 and 535. In one aspect, the first component may be the "x" most significant bits (MSBs) of signals 530 and 535, where "x" is an integer value greater than or equal to zero. In the example of FIG. 5, the first component may be of variable width in terms of the number of bits. Signals 530 and 535 may be compared to determine the particular number of matching MSBs. As pictured, correlation detection circuit 505 generates output signal 540. Signal 540 is provided to mask circuit 510. Signal 540 indicates whether signals 530 and 535 are coherent, e.g., have a common first component. If signals 530 and 535 are coherent, signal 540 indicates the number of matching bits or bit size of the common first component.

Correlation detection circuit 505 may be implemented using any of a variety of known circuits. In one aspect, for example, correlation detection circuit 505 may be implemented as a frequency analysis circuit that identifies common lower frequency components and different higher frequency components of signals 530 and 535. In another aspect, correlation detection circuit 505 may be implemented using Boolean logic gates such as exclusive OR circuitry and/or OR circuitry.

Mask circuit 510 is configured to generate a mask specified by signal 545 that is output to component handling circuit 515, operations circuit 520, and output selection circuit 525. Component handling circuit 515 may be configured to extract the first component from at least one of signal 530 or signal 535. Component handling circuit 515 further may be configured to extract a second component from each of signals 530 and 535. In one aspect, component handling circuit 515 extracts the various components by applying the mask generated by mask circuit 510. While the first component from signals 530 and 535 may be common, the second component of signal 530 may be different from the second component of signal 535. As noted, in the example of FIG. 5, the width of the first component (and second components) may vary from one iteration of system 105 to another. For example, the common component may be 1 bit in a first iteration, 5 bits in a second iteration, 5 bits in a third iteration, and zero bits in a fourth iteration with the second component being formed of the remainder of bits of the signal in each iteration. In some cases, the entirety of signals 530 and 535 may be found to match, e.g., where the second component is zero bits.

Component handling circuit 515 outputs the first component and the second components specified by signal 550. Appreciably, in the case where signals 530 and 535 are not coherent, the first component will be zero bits in width, while the second component of signal 530 is the entirety of signal 530 and the second component of signal 535 is the entirety of signal 535. Component handling circuit 515 outputs the first component on signal 555, which is provided to output selection circuit 525. As pictured, signal 555 may bypass operations circuit 520.

Operations circuit 520 performs one or more selected operations. Operations circuit 520 generates signal 560 as an output that is provided to output selection circuit 525. In one aspect, operations circuit 520 utilizes the mask specified by signal 545 to selectively enable and/or disable selected circuit elements implemented therein. For example, since the mask indicates the particular bits of the common first component, bits of the mask may be used to deactivate or disable circuit elements of operations circuit 520 dedicated to operating upon the first component when signals 530 and 535 are coherent. Similarly, operations circuit 520 may use the mask to enable or activate circuit elements of operations circuit 520 that operate upon the second or uncommon components.

Output selection circuit 525 may be configured to combine signal 555 with signal 560. For example, output selection circuit 525 may be configured to concatenate signal 555 with signal 560. In one aspect, output selection circuit 525 may use the mask specified by signal 545 to determine the portion of signal 555 to pass in combination with signal 560. For example, in the case where signals 530 and 535 are not coherent, the mask will indicate that output selection circuit 525 is to pass the entirety of signal 560 as signal 565. In the case where signals 530 and 535 are coherent, the mask indicates that output selection circuit 525 is to concatenate a particular number of bits of signal 560 with the first component specified by signal 555 and provide the result as signal 565.

Figure 6:
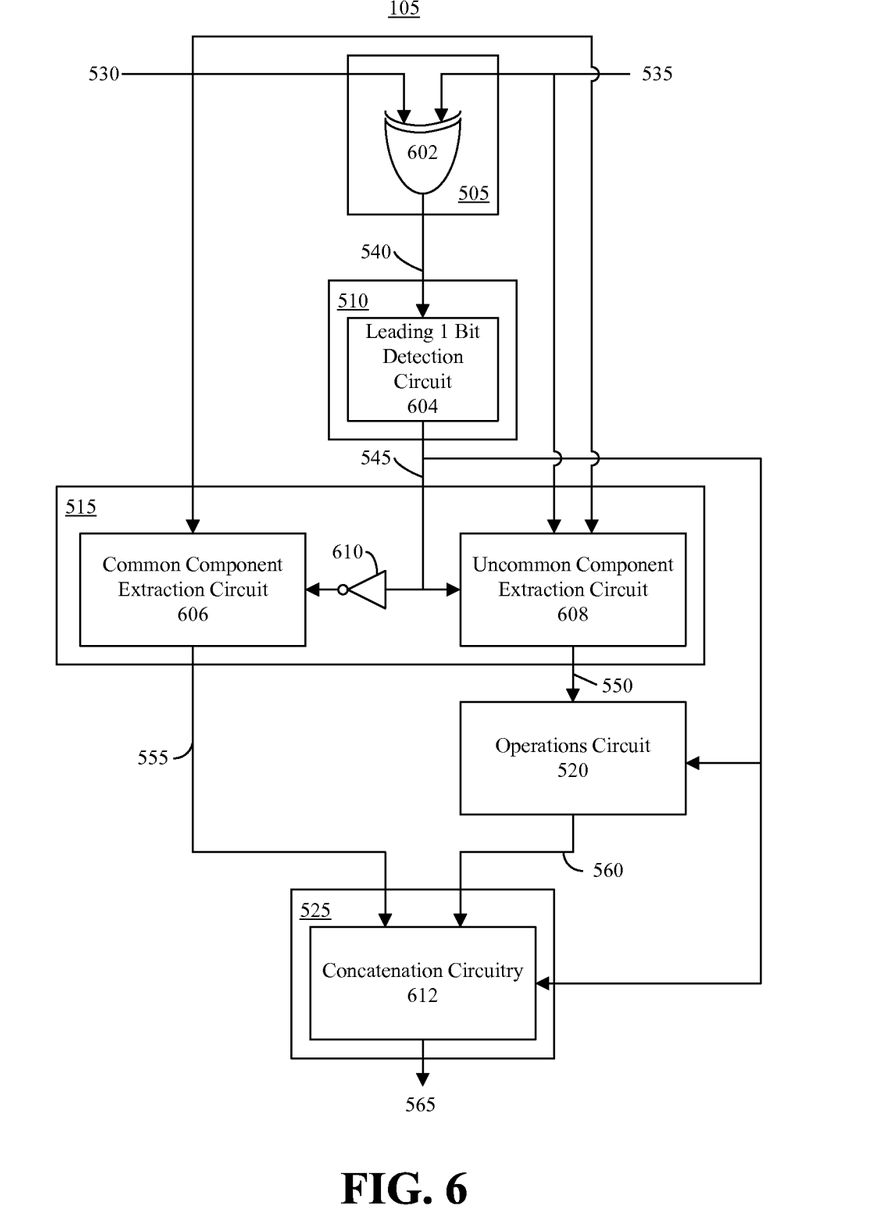
FIG. 6 is a block diagram illustrating an exemplary implementation of the system of FIG. 5.

FIG. 6 is a block diagram illustrating an exemplary implementation of system 105 of FIG. 5. As shown, system 105 includes correlation detection circuit 505, mask circuit 510, component handling circuit 515, operations circuit 520, and output selection circuit 525.

following rewritten paragraph:

In the example of FIG. 6, correlation detection circuit 505 may be implemented using exclusive OR circuitry 602. Signals 530 and 535 may be compared. Correlation detection circuit 505 generates signal 540, which indicates the particular bits of signals 530 and 535 that match or are the same. For example, consider the case where signal 530 is an eight bit binary encoded signal of [11110100] and signal 535 is an eight bit binary encoded signal of [11110110]. The result of an exclusive OR operation performed on signals 530 and 535 is [00000010], as specified by signal 540.

Mask circuit 510 may be implemented as a leading 1 bit detection circuit 604504. Mask circuit 510, responsive to receiving signal 540, generates a mask specified by signal 545. In general, mask circuit 510 detects the leading 1 bit of signal 540 and converts each bit thereafter to a 1. Continuing with the prior example, signal 545 would specify a binary encoded mask of [00000011].

Component handling circuit 515 may include a common component extraction circuit 606 and an uncommon component extraction circuit 608. As pictured, component handling circuit 515 further includes an inverter 610. Inverter 610 generates an inverted version of the mask, e.g., signal 545, which is provided to common component extraction circuit 606. Signal 545, without inversion, is provided to uncommon component extraction circuit 608. Common first component extraction circuit 606 is configured to extract the common component, if any, from signal 530. Uncommon component extraction circuit 608 is configured to extract the uncommon, e.g., second, component from each of signals 530 and 535. In one aspect, the term "extracting" as used herein as applied to components may mean zeroing each bit of a signal that is not part of the component sought to be extracted, whether a first component, a second component, common or not. In another aspect, extraction may mean separating a first component from a second component of the signal.

Common component extraction circuit 606 may be implemented using AND circuitry configured to perform a logical AND operation between signal 530 and the inverted version of signal 545. For example, a logical AND of signal 530 [11110100] and the inverted version of signal 545 [11111100] results in a binary encoded value of [11110100]. The first common component in this example is [111101]. The remainder of signal 430 is zeroed out in that the least significant two bits are [00]. The result determined by common component extraction circuit 606 may be output as signal 555.

Uncommon component extraction circuit 608 may be implemented using AND circuitry configured to perform a logical AND operation between signal 530 and signal 545 and a logical AND operation between signal 535 and signal 545. For example, a logical AND of signal 530 [11110100] and signal 545 [00000011] results in a binary encoded value of [00000000]. The common component in this example, being [111101], is zeroed out leaving the least significant two bits of signal 530, which happen to be [00], as the uncommon second component of signal 530. A logical AND of signal 535 [11110110] and signal 545 [00000011] results in a binary encoded value of [00000010]. The common component in this example, again being [111101] is zeroed out leaving the least significant two bits of signal 535, which are [10], as the uncommon second component of signal 535. The results determined by uncommon component extraction circuit 608 are output as signal 550.

Operations circuit 520 may perform one or more operations using only the uncommon components received via signal 550. It should be appreciated that in the case where signals 530 and 535 are not coherent, the entirety of signals 530 and 535 may be provided from uncommon component extraction circuit 608 to operations circuit 520 via signal 550.

As pictured, signal 545 is provided to operations circuit 520. In one aspect, signal 545 may be used by operations circuit 520 to deactivate or disable circuit elements that are dedicated to processing bits of the common component. For example, if the value of bits 7, 6, 5, 4, 3, and 2 are common to both signals 530 and 535, circuit elements dedicated to operating upon bits 7, 6, 5, 4, 3, and 2 of signals 530 and 535 within operations circuit 520 may be disabled. The bits of signal 545 corresponding to the common bits will be zero and may be used as clock enable signals to such components to disable the components. When signals 530 and 535 are not coherent, signal 545 will have each bit equal to 1 and not disable any circuit elements of operations circuit 520.

Output selection circuit 525 includes a concatenation circuit 612. As pictured concatenation circuit 612 receives signals 555 and 560 as inputs. Concatenation circuit 612 further may receive signal 545 as a selection signal. Signal 545 indicates how many bits of signal 555 are to be concatenated with signal 560. For example, signal 555 specifies the common component. Signal 545 indicates a bit width of the common component 555 in that each bit equal to zero in the mask corresponds to a bit of the common component. Referring to the prior example, the common component is six bits. Accordingly, six bits of signal 555 are concatenated with two bits of signal 560. The resulting concatenated output of signals 555 and 560 is output from output selection circuit 525 as signal 565.

It should be appreciated that FIG. 6 is provided for purposes of illustration. As such, the example of FIG. 6 is not intended to be limiting of the inventive arrangements disclosed herein. In another aspect, for example, the mask may be used to extract the first component, while the inverted version of the mask may be used to extract the second components. The particular logical operations performed by the circuitry in that case would vary from that illustrated in FIG. 6. In any case, the mask may be used to extract the first and second components whether the mask is used directly or indirectly, e.g., in the case where an inverted version of the mask is used or applied to a signal.

Figure 7:
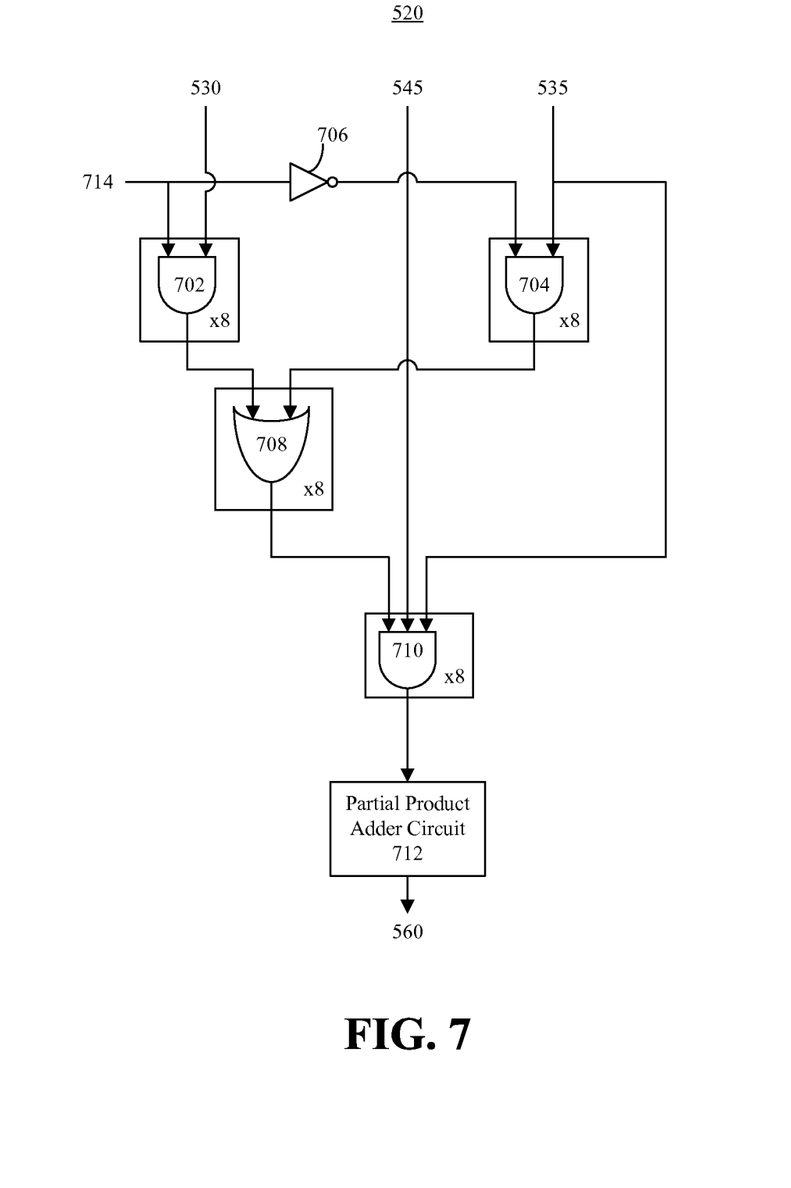
FIG. 7 is a block diagram illustrating an exemplary implementation of an operations circuit.

FIG. 7 is a block diagram illustrating an exemplary implementation of operations circuit 520 of FIGS. 5 and/or 6. In the example of FIG. 7, operations circuit 520 is an interpolation circuit. For purposes of illustration, signals 530 and 535 may be eight bit signals. As pictured, signal 530 is provided to AND gates 702. Presuming eight bit input signals, eight AND gates 702 may be used to process input signal 520 and a weight signal 714. Signal 535 is provided to AND gates 704. Eight AND gates 704 may be used to process signal 525 using an inverted version of signal 714 generated by inverter 706.

Output from each of AND gates 702 and each of AND gates 704 is processed by an OR gate 708. Eight OR gates 708 may be used. OR gates 708 generate eight partial product terms with each partial product term being n+1 bits wide, e.g., nine bits in this example. It should be appreciated that the alignment of outputs from AND gates 702 and AND gates 704 may be maintained with OR gates 708. For example, a first AND gate 702 may process the first bit (e.g., the MSB) of signal 530. A first AND gate 704 may process a first bit (e.g., the MSB) of signal 535. The second AND gate 702 and 704 processes the next, or second MSB, bit of signals 530 and 535, respectively, and so on. Accordingly, a first OR gate 708 may process the output from the first of AND gates 702 and the output of the first of AND gates 704. A second OR gate 708 may process the output from the second of AND gates 702 and the output from the second of AND gates 704, etc.

AND gates 710 receive the output from OR gates 708, signal 535, and signal 545 which specifies the mask. AND gates 710 generate nine masked partial product terms with each masked partial product term being n+1 bits, e.g., nine in this example. Bits that only affect the outputs of partial product adder 712 that will be bypassed are cleared using signal 545.

In one aspect, the zero value for each bit of the common component as specified by the mask of signal 545 provided to the various AND gates 710 results in the generation of a zero value from that AND gate. The output of AND gates 710 is provided to partial product adder circuit 712. The resulting addition of the masked partial product terms is output as signal 560.

In another aspect, signal 545 may be used as a clock enable signal, e.g., to gate the clock signal (not shown), for each of AND gates 710. Each AND gate 710, for example, may receive a corresponding bit of signal 545 as a clock enable signal. Those AND gates 710 that receive a zero bit of signal 545 are disabled, e.g., the clock signal is gated.

Figure 8:
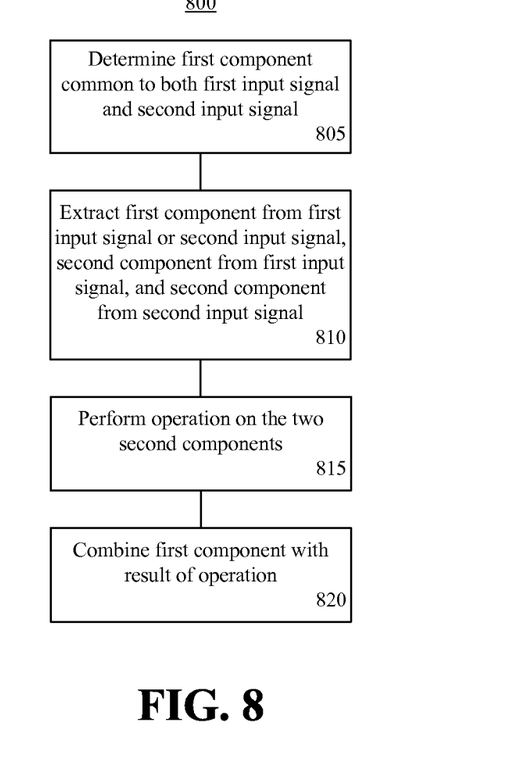
FIG. 8 is a flow chart illustrating an exemplary method of processing signals.

FIG. 8 is a flow chart illustrating an exemplary method 800 of processing signals. Method 800 may be performed by the system described with reference to FIGS. 1, 2, and/or 5 of this disclosure. Method 800 may begin in a state where a first input signal and a second input signal are received. In one aspect, the first input signal may specify a first texel, while the second input signal specifies a second, different texel that is local to the first texel in an image. The first and second texels, for example, may be adjacent to one another in the image being processed. In another example, the first input signal may represent a first sample of a sampled signal while the second input signal represents a second, or subsequent sample of the same sampled signal.

In block 805, the system determines a first component common to both the first input signal and the second input signal. In one aspect, the first component may be a fixed number of bits across a plurality of iterations of the system. In another aspect, the first component may be a number of bits that may vary across a plurality of iterations of the system.

In block 810, the system extracts the first component that is common to both the first input signal and the second input signal. The system further may extract a second component from each of the first input signal and the second input signal. The second component of the first input signal may be different than the second component of the second input signal.

In one aspect, the first and second components may be extracted using a mask. A mask may be generated that indicates the number of MSBs of the common component. In another aspect, the first and second components may be extracted by simply dividing the first input signal and the second input signal into components of fixed width, where each component of the first and second input signals is propagated through its own channel or wires thereby maintaining separation among components.

In block 815, the system performs one or more operations. For example, the operations circuit performs one or more operations upon the input signals. The operations circuit may perform operations using the entirety of the first and second input signals in the case where the first input signal is not coherent with the second input signal. The operations circuit may perform operations only upon the second components of the first and second input signals as illustrated in block 815. For example, the operations circuit may perform operations using only the second components of the first and second input signals in the case where the first input signal is coherent with the second input signal. In that case, the first components of the input signal are found to match and are not operated upon by the operations circuit.

In performing the selected operations, one or more circuit elements of the operations circuit may be enabled and/or disabled in real time responsive to the input signals being processed. In one aspect, disabling a circuit element may mean that the input signals provided to the circuit element that is disabled are prevented from transitioning so that the disabled circuit element does not transition. In another aspect, disabling a circuit element may mean gating the clock and/or providing a clock enable signal to the circuit element thereby disabling the circuit element.

In block 820, the system may combine the first component with a result of the operation performed in block 815. In one example, the system may concatenate the first component, which was found to be common between the first input signal and the second input signal, with the result of the operation of block 815.

In accordance with the inventive arrangements disclosed herein, power consumption during signal processing may be reduced by exploiting frequency invariance and spatial locality in received signals. A common component of the input signals may be identified and distinguished from other portions of the signals that differ. Power consumption may be reduced by operating upon the portions of the input signals found to be different and joining the result of the processing with the common component. The various operations performed are effectively implemented with input signals of reduced bit width, which may reduce the power that is consumed.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "plurality" means two or more than two.

As defined herein, the term "processor" means at least one hardware circuit configured to carry out instructions contained in program code. The hardware circuit may be an IC. Examples of a processor may include, but are not limited to, a CPU, an array processor, a vector processor, a digital signal processor (DSP), a field-programmable gate array (FPGA), a programmable logic array (PLA), an application specific integrated circuit (ASIC), programmable logic circuitry, a controller, a GPU, or the like.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

From time-to-time, the term "signal" may be used within this disclosure to describe physical structures such as terminals, pins, signal lines, wires, and the corresponding signals propagated through the physical structures. The term "signal" may represent one or more signals such as the conveyance of a single bit through a single wire or the conveyance of multiple parallel bits through multiple parallel wires. Further, each signal may represent bi-directional communication between two, or more, components connected by the signal.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of signal processing may include determining a first component common to a first input signal and a second input signal and extracting the first component from at least one of the first input signal or the second input signal, a second component from the first input signal, and a second component from the second input signal. The second component of the first input signal may be different from the second component of the second input signal. The method may include performing an operation using the extracted, second components and combining the first component with a result of the operation.

Determining the first component common to both the first input signal and the second input signal may include generating a mask specifying a boundary between the first component and the second component in the first input signal or the second input signal.

Extracting may include using the mask to extract the first component from at least one of the first input signal or the second input signal, using the mask to extract the second component from the first input signal, and using the mask to extract the second component from the second input signal.

Performing the operation using the extracted, second components may include enabling circuit elements of a plurality of circuit elements configured to perform the operation that operate upon the extracted, second components and disabling circuit elements of the plurality of circuit elements configured to perform the operation that operate upon the first component of the first input signal and the first component of the second input signal.

Performing the operation using the extracted, second components may include performing the operation using only the second component of the first input signal and only the second component of the second input signal.

In one aspect, the operation may be, or include, interpolation. In another aspect, the first input signal may include a first texel and the second input signal may include a second texel. In still another aspect, the first input signal is a first sample of a sampled signal and the second input signal is a second sample of the sampled signal.

In a further aspect, the first component may have a variable width for each of a plurality of iterations of the determining. In another aspect, the first component may have a fixed width for each of a plurality of iterations of the determining.

A system may include a correlation detection circuit configured to determine a first component common to a first input signal and a second input signal and a component handling circuit configured to extract the first component from at least one of the first input signal or the second input signal, a second component from the first input signal, and a second component from the second input signal. The second component of the first input signal may be different from the second component of the second input signal. The system also may include an operations circuit configured to perform an operation using the extracted, second components and an output selection circuit configured to combine the first component with a result of the operation.

In one aspect, the first component may have a variable width. In that case, the system further may include a mask circuit configured to generate a mask specifying a boundary between the first component and a second component of the first input signal or the second input signal. The output selection circuit may include a concatenation circuit configured to concatenate the first component with the result of the operation according to the mask.

The component handling circuit may include a common component extraction circuit configured to extract the first component using an inverted version of the mask and an uncommon component extraction circuit configured to extract the second component from the first input signal and the second component from the second input signal using the mask.

In one aspect, the operations circuit may include an interpolation circuit. In another aspect, the operations circuit may include a first plurality of circuit elements that operate upon the extracted, second components and a second plurality of circuit elements that operate upon the first component. The first plurality of circuit elements may be enabled and the second plurality of circuit elements disabled responsive to determining that the first component is common to the first input signal and the second input signal.

In some cases, the first component and the second components may have fixed widths.

The first input signal may be a first sample of a sampled signal and the second input signal may be a second sample of the sampled signal.

In another aspect, the system may be a processor. For example, the processor may be a graphics processing unit. The first input signal may include a first texel and the second input signal may include a second texel.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein.

Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of signal processing, comprising:
   determining by a correlation detection circuit whether a first part of a first input data and a third part of a second input data have a common component, the first input data comprising a first texel and the second input data comprising a second texel that is within a predetermined distance from the first texel in an image, the first input data further comprising the first part and a second part, the second input data further comprising the third part and a fourth part, the second part of the first input data being different from the fourth part of the second input data, and the first part of the first input data and the third part of the second input data having a variable width for each of a plurality of iterations of the determining whether the first part of the first input data and the third part of the second input data have a common component;
   extracting by a component handling circuit the first part from the first input data or the third part from the second input data, the second part from the first input data, and the fourth part from the second input data if it is determined that the first part of the first input data and the third part of the second input data have a common component;
   performing by an operation circuit an operation using the extracted second and fourth parts; and
   combining by an output selection circuit the extracted first part from the first input data or the third part from the second input data with a result of the operation.

2. The method of claim 1, wherein determining whether the first part of the first input data and the third part of the second input data have a common component comprises:
   generating a mask by a mask generating circuit specifying a boundary between the first part and the second part in the first input data or the third part and the fourth part in the second input data.

3. The method of claim 2, wherein extracting comprises:
   using the mask by the component handling circuit to extract the first part from the first input data or the third part from the second input data;
   using the mask by the component handling circuit to extract the second part from the first input data; and
   using the mask by the component handling circuit to extract the fourth part from the second input data.

4. The method of claim 1, wherein performing the operation using the extracted second and fourth parts comprises:
   enabling circuit elements of a first plurality of circuit elements of the operation circuit configured to perform the operation that operate upon the extracted second and fourth parts; and
   disabling circuit elements of a second plurality of circuit elements of the operation circuit configured to perform the operation that operate upon the first part of the first input data and the third part of the second input data if it is determined that the first part of the first input data and the third part of the second input data have a common component.

5. The method of claim 1, wherein performing the operation using the extracted second and fourth parts comprises:

performing by the operation circuit the operation using only the second part of the first input data and the fourth part of the second input data.

6. The method of claim 1, wherein the operation comprises interpolation.

7. A system, comprising:
a correlation detection circuit configured to determine whether a first part of a first input data and a third part of a second input data have a common component, the first input data comprising a first texel and the second input data comprising a second texel that is within a predetermined distance from the first texel in an image, the first input data further comprising the first part and a second part, the second input data further comprising the third part and a fourth part, the second part of the first input data being different from the fourth part of the second input data, and the first part of the first input data and the third part of the second input data having a variable width for each of a plurality of iterations of the determining whether the first part of the first input data and the third part of the second input data have a common component;
a component handling circuit configured to extract the first part from the first input data or the third part from the second input data, the second part from the first input data, and the fourth part from the second input data if the correlation detection circuit determines that the first part of the first input data and the third part of the second input data have a common component;
an operations circuit configured to perform an operation using the extracted second and fourth parts; and
an output selection circuit configured to combine the extracted first part of the first input data or the third part of the second input data with a result of the operation.

8. The system of claim 7, wherein the system further comprises:
a mask circuit configured to generate a mask specifying a boundary between the first and second parts of the first input data or the third and fourth parts of the second input data.

9. The system of claim 8, wherein the output selection circuit comprises a concatenation circuit configured to concatenate the first part of the first input data or the third part of the second input data with the result of the operation according to the mask.

10. The system of claim 8, wherein the component handling circuit comprises:
a common component extraction circuit configured to extract the first part from the first input data or the third part from the second input data using an inverted version of the mask; and
an uncommon component extraction circuit configured to extract the second part from the first input data and the fourth part from the second input data using the mask.

11. The system of claim 7, wherein the operations circuit comprises:
an interpolation circuit.

12. The system of claim 7, wherein the operations circuit comprises:
a first plurality of circuit elements that operate upon the extracted second part and the extracted fourth part; and
a second plurality of circuit elements that operate upon the extracted first part of the first input data or the third part of the second input data;
wherein the first plurality of circuit elements is enabled and the second plurality of circuit elements is disabled if the correlation detection circuit determines that the first part of the first input data and the third part of the second input data have a common component.

13. The system of claim 7, wherein the system comprises a processor.

14. The system of claim 13, wherein:
the processor comprises a graphics processing unit.

* * * * *